United States Patent
Shaw et al.

(10) Patent No.: US 11,907,558 B2
(45) Date of Patent: Feb. 20, 2024

(54) POLICY BASED STUB FILE AND CLOUD OBJECT RETENTION

(71) Applicant: Dell Products L.P., Round Rock, TX (US)

(72) Inventors: Rabi Shankar Shaw, Bangalore (IN); Anurag Bhatnagar, Bangalore (IN); Akash Gosain, East Delhi (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/860,835

(22) Filed: Jul. 8, 2022

(65) Prior Publication Data
US 2024/0012574 A1 Jan. 11, 2024

(51) Int. Cl.
*G06F 3/06* (2006.01)
(52) U.S. Cl.
CPC ............ *G06F 3/0643* (2013.01); *G06F 3/067* (2013.01); *G06F 3/0619* (2013.01); *G06F 3/0647* (2013.01)
(58) Field of Classification Search
CPC .... G06F 3/0643; G06F 3/0619; G06F 3/0647; G06F 3/067
See application file for complete search history.

(56) References Cited

U.S. PATENT DOCUMENTS

| | | | |
|---|---|---|---|
| 7,693,877 B1* | 4/2010 | Zasman | G06F 16/185 |
| | | | 707/707 |
| 9,596,291 B1* | 3/2017 | Basva | H04L 67/06 |
| 2007/0179990 A1* | 8/2007 | Zimran | G06F 16/185 |
| 2009/0300079 A1* | 12/2009 | Shitomi | G06F 3/0605 |
| 2012/0030179 A1* | 2/2012 | Kauffman | G06F 16/248 |
| | | | 711/111 |
| 2020/0073574 A1* | 3/2020 | Pradhan | G06F 3/0649 |

OTHER PUBLICATIONS

DELL EMC, " DELL EMC Unity: CLout Tiering Appliance (Cta) A Detailed Review," White Paper, Mar. 2019, 32 pages.
Techopedia, "File Handle," https://www.techopedia.com/definition/3313/file-handle, Feb. 2, 2017, 11 pages.
U.S. Appl. No. 17/405,707 filed in the name of Rabi Shankar Shaw et al. Aug. 18, 2021, entitled "File Tiering to Different Storage Classes of a Cloud Storage Provider."
U.S. Appl. No. 17/720,421 filed in the name of Vasu Subramanian Apr. 14, 2022, entitled "Archiving Operations for Compressed Data Using File Layout."

* cited by examiner

*Primary Examiner* — Eric T Loonan
(74) *Attorney, Agent, or Firm* — Ryan, Mason & Lewis, LLP

(57) ABSTRACT

A method comprises receiving an input specifying one or more rules in connection with archiving one or more of a plurality of files from a source storage location to a target storage location. The one or more rules specify one or more constraints for retention of the one or more of the plurality of the files. In the method, the one or more of the plurality of files are retrieved from the source storage location for migration to the target storage location. A request is sent to the target storage location that the target storage location invoke the one or more rules to retain the one or more of the plurality of files in the target storage location. The target storage location comprises a cloud storage platform.

20 Claims, 15 Drawing Sheets

FIG. 4 wu-d2121-fs1 >

| Name | Size |
|---|---|
| ☑ file 11 | 10 KB |
| file 12 | 10 KB |
| file 13 | 10 KB |
| file 14 | 10 KB |
| file 15 | 10 KB |

File Access Denied — ☐ ✕

You need permission to perform this action

You require permission from Administrators to make changes to this file file 11
Type: Text Document
Size: 10.0KB
Date Modified: 7/18/2014 1:25 PM

[ Try Again ]  [ Cancel ]

⌄ Fewer details

400

```
//Cloud Retention Protoype
class Policy
{
    uint16 policyId;
    Expression expression;
    Cloud cloud;
    int stubRetentionDurationYears;
};

class Task
{
    uint16 taskID;
    time_t startTime;
    FileSystem fileSystem;
    Share share;
    Policy policy;
};

class Scheduler
{
public:
    static Task getTaskToRun(); // scans the database using a thread and returns the task to run
};
```

FIG. 6A

```
class CloudFactory
{
public:
    static CloudAdapter* getCloudAdapter(Cloud cloud)
    {
        if(cloud.type == "s3")
            return new AmazonS3Adapter(cloud);
        else if(cloud.type == "google")
            return new GoogleAdapter(cloud);
        else if(cloud.type == "azure")
            return new AzureAdapter(cloud);
        else
            return NULL;
    }
};

class CloudAdapter
{
public:
    virtual int archive(FileHandle fh) = 0;
    virtual bool applyRetention(int OID, int timeInYears) = 0;
};

class AmazonS3Adapter : public CloudAdapter
{
public:
    int archive(FileHandle fh);
    bool applyRetention(int OID, int timeInMonths);
};
```

FIG. 6C

```
class GoogleAdapter : public CloudAdapter
{
    public:
        int archive(FileHandle fh);
        bool applyRetention(int OID, int timeInMonths);
} class AzureAdapter : public CloudAdapter
{
    public:
        int archive(FileHandle fh) = 0;
        bool applyRetention(int OID, int timeInMonths);
}

// Main glider service prototype code
class MainService()
{
    public:
        bool runTask();
}
```

FIG. 6D

```
bool MainService::runTask()
{
    Task taskToRun = Scheduler::getTaskToRun();
    NasFileServer* fileServer = FileServerFactory::getFileServer(taskToRun.getFileSystem().getFileServerID);
    vector<FileHandle> fileHandles = fileServer.filter(taskToRun.policy, taskToRun.fileSystem);
    CloudAdapter* cloudAdapter = CloudAdapterFactory::getCloudAdapter(taskToRun.policy.cloud);
    for(FileHandle fh : fileHandles)
    {
        bool nasRetentionStatus = false;
        int OID = cloudAdapter->archive(fh);
        bool stubCreated = fileServer->createStub(fh);
        if(!stubCreated)
            return false;

// same retention as was mentioned in the policy was applied to both onprem and cloud
        bool cloudRetentionStatus = cloudAdapter->applyRetention(OID,
taskToRun.policy.stubRetentionDurationYears);
        if(cloudRetentionStatus)
            nasRetentionStatus = fileServer->retainFile(fh);
        if(!nasRetentionStatus)
            return false;
    }
    return true;
}
```

FIG. 6E

```
Jun 23 16:40:04 (1403041662915840 (DEBUG_5)  PEPlugin::parsePolicy() - action delay stub value '0'
Jun 23 16:40:04 (1403041662915840 (DEBUG_2)  PEPlugin::setnasretentiontimesecs() - setting NAS Retention time to 172800
Jun 23 16:40:04 (1403041662915840 (DEBUG_2)  PEPlugin::setcloudretentiontimesecs() - setting CLOUD Retention time to 172800
Jun 23 16:40:04 (1403041662915840 (DEBUG_5)  PEPlugin::parsePolicy() - action retain value '2'
Jun 23 16:40:04 (1403041662915840 (DEBUG_5)  PEPlugin::parsePolicy() - primary stub retention is set to 'true'
Jun 23 16:40:04 (1403041662915840 (DEBUG_5)  PEPlugin::parsePolicy() - cloud retention is set to 'true'
Jun 23 16:40:04 (1403041662915840 (DEBUG_2)  PEPlugin::parsePolicy tServerName = ABCD
Jun 23 16:40:04 (1403041662915840 (DEBUG_2)  Calling findByName from parsePolicy for ABCD
Jun 23 16:40:04 (1403041662915840 (DEBUG_2)  SL_FileServerManager::findByName ENTRY :: ServerName is ABCD
Jun 23 16:40:04 (1403041662915840 (INFO)     Env Var: FM_MD5_VERIFY_ARCHIVE_TO_CLOUD=false
Jun 23 16:40:04 (1403041662915840 (INFO)     Env Var: FM_CREATE_LOCAL_TMP_ARCHIVE_FILES=false
Jun 23 16:40:04 (1403041662915840 (INFO)     Env Var: FM_COMMIT_TO_CLOUD=true Jun 23 16:40:04 (1396726613914880 (DEBUG_2) AmazonS3Adapter::initMembers AmazonS3 at https://s3-
1234567.amazonaws.com (port 443) CTA bucket emc-cta-XYZ access key ABC123 create block size 5 MB write block size 5 MB
m_context /emc-cta-XYZ m_resource /emc-cta-XYZ
Jun 23 21:09:58 (1396726613914880 (DEBUG_2) AmazonS3Adapter: constructed adapter for AmazonS3 at https://s3-
1234567.amazonaws.com:443 CTA bucket emc-cta-XYZ access key ABC123 create block size 5 MB write block size 5 MB
```

```
Jun 23 21:10:09 (13967253443584) (DEBUG_2) HTTP request is:
PUT /cta_10.244.66.116_1655998808_13642_1 HTTP/1.1^M
Authorization: AWS4-HMAC-SHA256 Credential=ABC123/20220623/ap-1234567/s3/aws4_request,SignedHeaders=host;x-amz-content-sha256;x-amz-date;x-amz-meta-fma-attr,
Signature=123abc456def789ghi^M
Expect: 100-continue^M
accept: */*^M
content-length: 15708^M
content-type: application/octet-stream^M
Content-MD5:1abc2de34f567ghij^M
date: Thu, 23 Jun 2022 15:40:08 +0000^M
host: emc-cta-XYZ.s3.amazonaws.com^M
x-amz-content-sha256: jkl7893mn4o56p7qr8^M
x-amz-date: 20220623T154008Z^M
x-amz-meta-fma-attr:
fma_layout_version=7_3_1,size=15708,fma_proto=1,fma_size=15708,fma_archive_time=13300472408000000,fma_cifs_creation_time=13300472223745070,fma_cifs_access_time=13300472223745040,fma_cifs_modify_time=13300472240193430,fma_cifs_change_time=13300472240193860,fma_cifs_attributes=32,fma_cifs_ownerSID=ADMINISTRATOR,fma_security_desc_len=84,fma_cifs_aux_object=NULL,fma_security_desc_hdr_1=ASDFJKLFRFRGHGH_d8ZXCV,fma_num_security_desc_hdrs=1^M
^M
<?xml version="1.0" encoding="UTF-8"?>
<Retention xmlns="http://s3.amazonaws.com/doc/2002-06-01/">
  <Mode>GOVERNANCE</Mode>
  <RetainUntilDate>20250623T154008Z</RetainUntilDate>
</Retention>
```

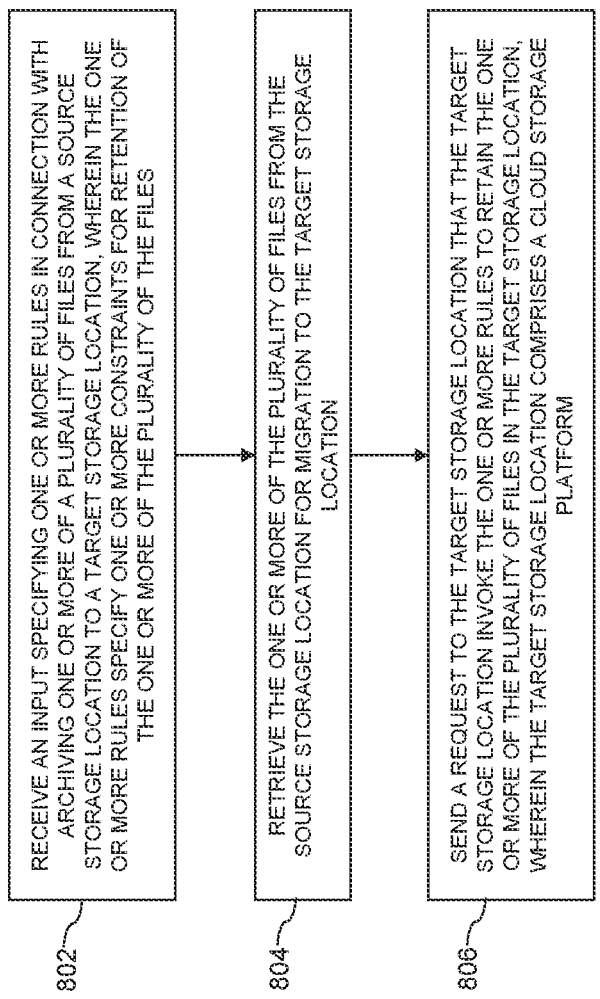

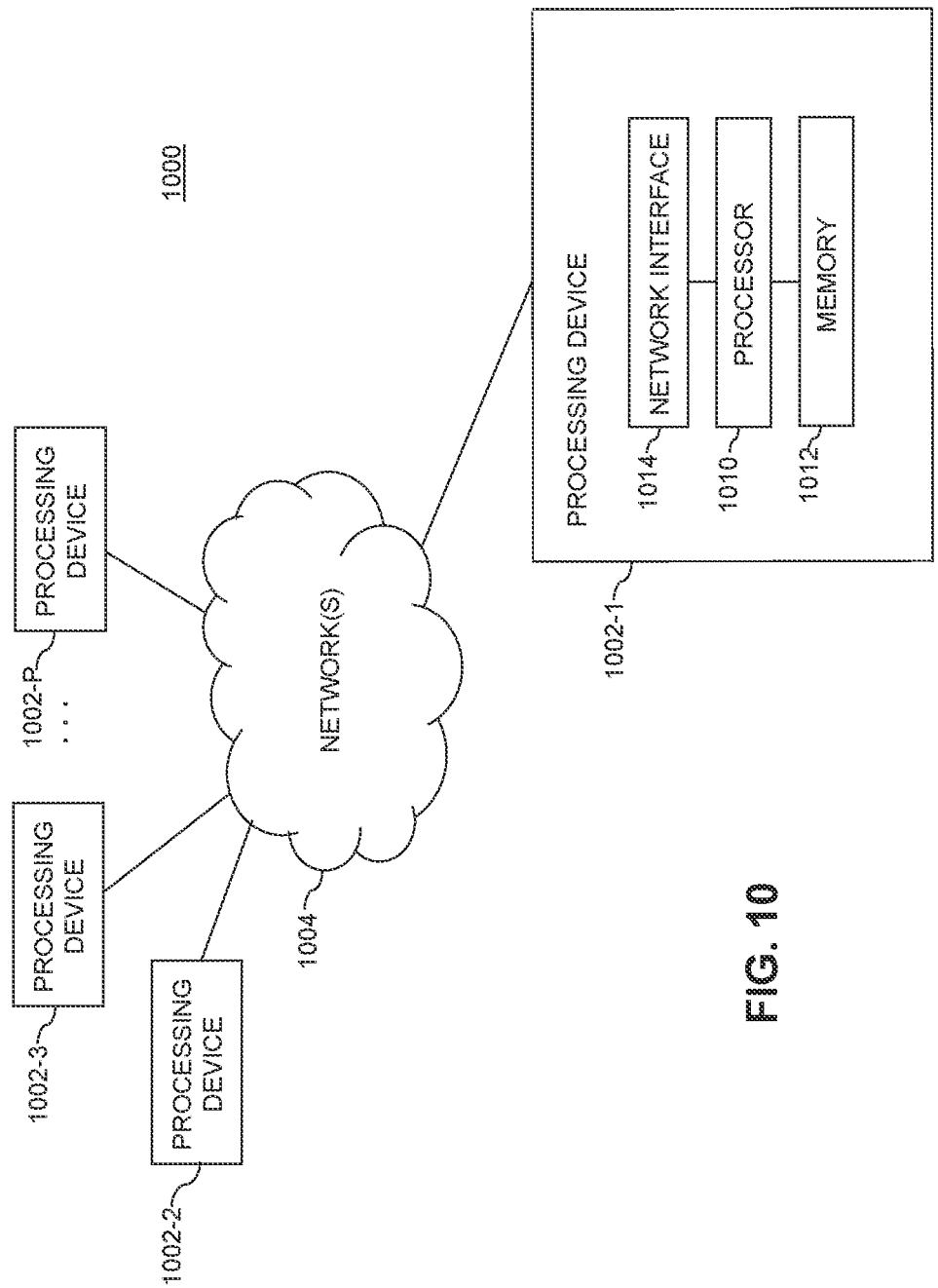

POLICY BASED STUB FILE AND CLOUD OBJECT RETENTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

In data storage, files that are frequently used and/or critical are generally stored in local storage for fast access. Files that are less frequently used and that do not require the same level of access as the files in local storage can be archived and stored in, for example, low-cost object and cloud storage tiers.

Tiered data may be deleted from cloud storage accidentally or due to, for example, third party attacks (e.g., malware and/or ransomware attacks). In some cases, the data may be permanently deleted, which can cause entities and/or individuals great expense and loss of important information.

SUMMARY

Illustrative embodiments provide techniques for implementing one or more data retention policies in connection with storage of data in cloud platforms.

In one embodiment, a method comprises receiving an input specifying one or more rules in connection with archiving one or more of a plurality of files from a source storage location to a target storage location. The one or more rules specify one or more constraints for retention of the one or more of the plurality of files. In the method, the one or more of the plurality of files are retrieved from the source storage location for migration to the target storage location. A request is sent to the target storage location that the target storage location invoke the one or more rules to retain the one or more of the plurality of files in the target storage location. The target storage location comprises a cloud storage platform.

These and other illustrative embodiments include, without limitation, methods, apparatus, networks, systems and processor-readable storage media.

BRIEF DESCRIPTION OF THE DRAWINGS

FIG. 4 depicts a screenshot of a result of an attempted deletion of a stub file subject to a retention policy according to an illustrative embodiment.

FIGS. 6A-6E depict portions of example pseudocode corresponding to specification and implementation of a data retention policy according to an illustrative embodiment.

FIGS. 7A and 7B depict portions of an example retention log corresponding to implementation of a data retention policy according to an illustrative embodiment.

FIG. 8 depicts a process for implementing one or more data retention policies in connection with migration of data to a cloud storage platform according to an illustrative embodiment.

FIGS. 9 and 10 show examples of processing platforms that may be utilized to implement at least a portion of an information processing system according to illustrative embodiments.

DETAILED DESCRIPTION

Figure 1:
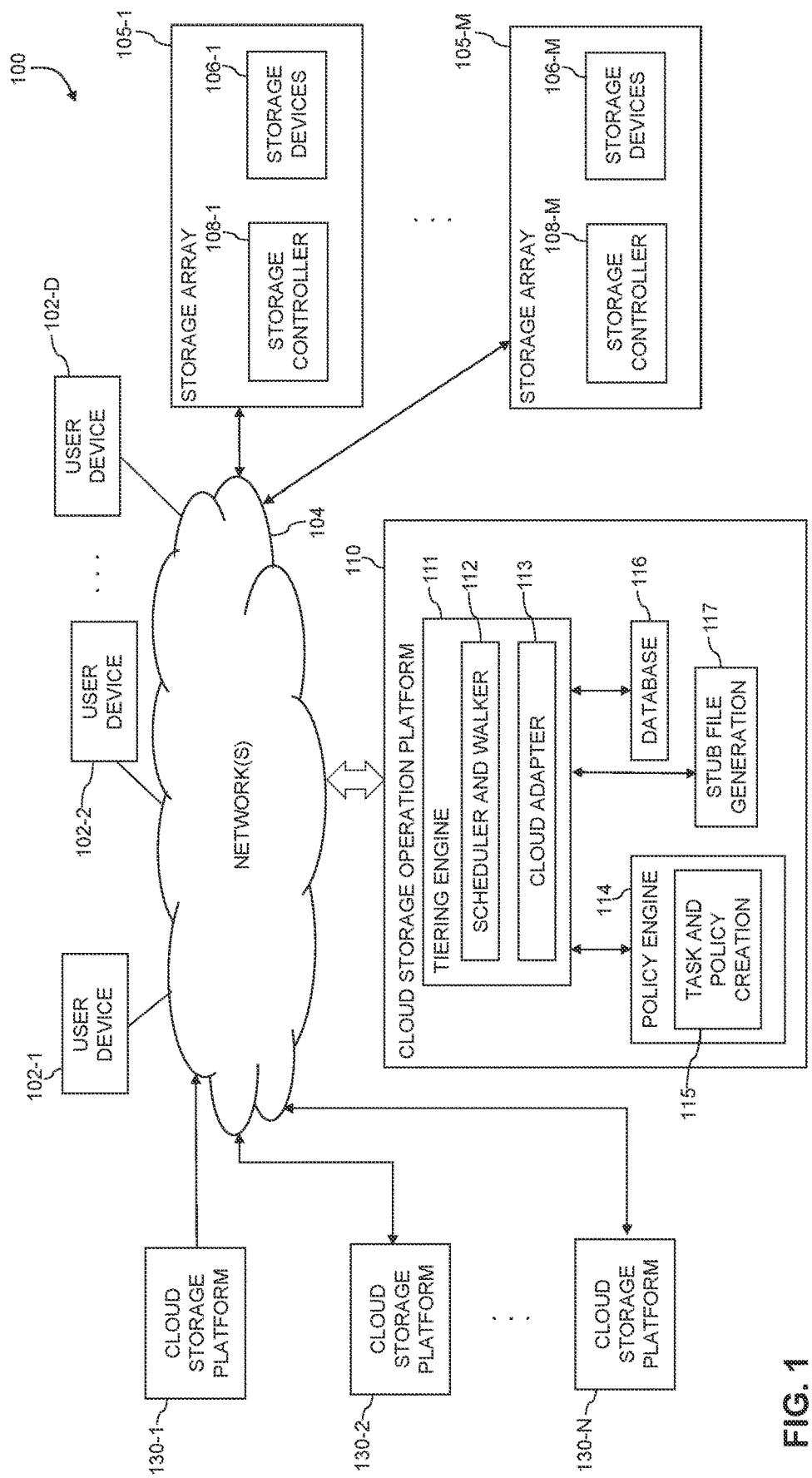
FIG. 1 depicts details of an information processing system with a cloud storage operation platform for implementing one or more data retention policies in connection with migration of data to a cloud storage platform according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "stub file" refers to a file placed in an original file location on a storage device when the original file is archived to an archive location, such as, for example, a cloud storage platform. According to an embodiment, when a stub file is read in an input-output (TO) operation, the IO operation is passed through to the original file located in the archive location, and the original file may be presented to a user as if the original file were in its original location on the storage device. The stub file occupies less memory space ("size on disk") than the original file.

Illustrative embodiments provide techniques for defining and implementing data retention policies for stub files in local storage and archived files in cloud storage to which the stub files correspond. Advantageously, users can input one or more policies which define different criteria for retention of data in cloud platforms and in local storage in order to avoid permanent deletion of the data.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a cloud tiering appliance (CTA), but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which archiving and migration are being performed. For example, in some embodiments, the user devices 102 are assumed to be associated with repair technicians, system administrators, information technology (IT) managers, software developers release management personnel or other authorized personnel configured to access and utilize the cloud storage operation platform 110.

The cloud storage operation platform 110 of the system 100 is configured to move data between the storage arrays 105 and one or more cloud storage platforms 130-1, 130-2, . . . 130-N, collectively referred to herein as cloud storage platforms 130. The cloud storage operation platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move data, for example, by moving data files, snapshots or other data objects in and between the user devices 102, the storage arrays 105 and the cloud storage platforms 130. A given data object may comprise a single data file, or multiple data files. According to one or more embodiments, the cloud storage operation platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, Google® and/or IBM® Cloud Object Storage (COS) platforms, or other available cloud infrastructures.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, on behalf of respective infrastructure tenants each corresponding to one or more users associated with respective ones of the user devices 102 provides a platform for managing migration of data to different storage classes of a cloud storage platform. Referring to FIG. 1, the cloud storage operation platform 110 comprises a tiering engine 111, a policy engine 114, a database 116 and a stub file generation engine 117. The tiering engine 111 comprises a scheduler and walker component 112 and a cloud adapter component 113. The policy engine 114 comprises a task and policy creation component 115.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the of the scheduler and walker component 112 of the cloud storage operation platform 110. The job scheduler interacts with the policy engine 114. For example, referring to the operational flow 200 in FIG. 2, and as described in more detail herein below, once an archiving policy including data retention constraints has been specified by, for example, a user via one of the user devices 102, the policy is provided to the scheduler and walker component 112 from the policy engine 114. The policy and its constraints are used by the scheduler and walker component 112 as a filter to select files which are to be archived and to which retention rules are to be applied. The scheduler and walker component 112 schedules archiving or file tiering tasks and communicates with the storage arrays 105 to retrieve lists of files to be archived or tiered based on the specified policies from the policy engine 114. Tasks may start at a scheduled time that can be pre-configured or user-specified via one or more user interfaces. Upon receipt of the files matching the policy rules from one or more of the storage arrays 105, the scheduler and walker component 112 sends the files and the corresponding policy rules to the cloud adapter component 113. The cloud adapter component 113 functions as an interface between the cloud storage operation platform 110 and the cloud storage platforms 130.

The cloud storage operation platform 110 can include at least one application programming interface (API) that permits an external component to control selection between various modes of operation. One or more external components can access the configuration file via such an API in order to control a mode of operation of the cloud storage operation platform 110. For example, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the cloud storage operation platform 110 can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays 105 and/or user devices 102.

In a file tiering process (also referred to herein as "cloud tiering") or file archiving process, the policy engine 114 is configured to identify files that fit an administrator or other user-defined criteria, and the cloud storage operation platform 110 initiates movement of the identified files to a cloud storage platform 130. The stub file generation engine 117 creates a stub file in the original file location on, for example, the storage array 105 or the user device 102. According to an embodiment, when the stub file is read, the cloud storage operation platform 110 recalls or passes an IO operation through to the original file located in the cloud storage platform 130, and the original file may be presented to a user as if the original file were in its original location on the storage array 105 or user device 102. Stub files comprise information about destinations in the cloud storage platforms 130 where the files corresponding to the stub files are located.

In a block archiving process, the scheduler and walker component 112 identifies block snapshots that fit an administrator or other user-defined criteria based on one or more policies received from the policy engine 114 and, in conjunction with the cloud adapter component 113, initiates archiving of the identified snapshots to a cloud storage platform 130, leaving the identified snapshots in the storage arrays 105 or user devices 102. After the identified snapshots are backed up to one or more of the cloud storage platforms 130, the original snapshots can be erased from the storage arrays 105 or user devices 102 to free up space. Users may initiate restoring of one or more snapshots to one or more of the storage arrays 105 or user devices 102.

Figure 2:
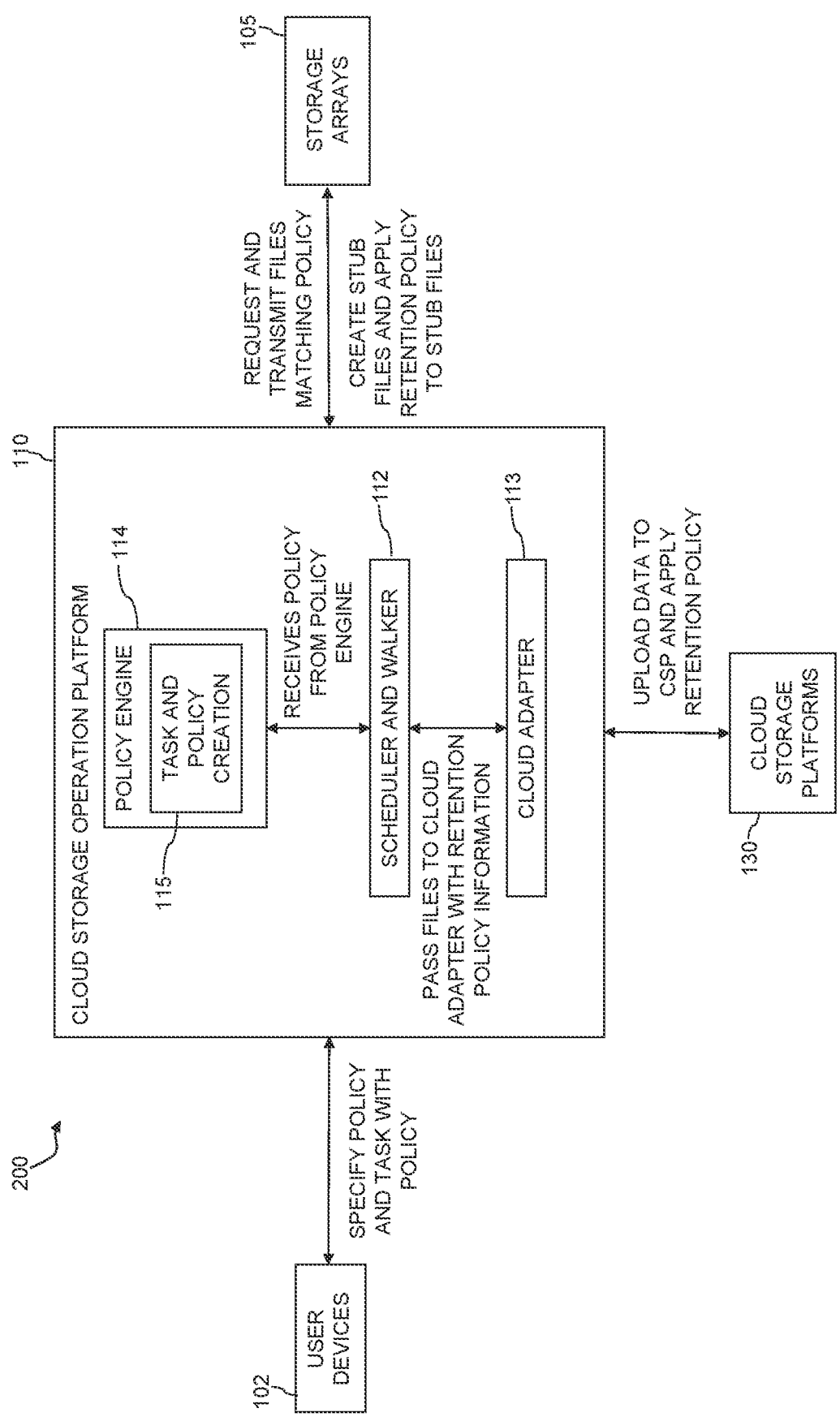
FIG. 2 depicts an operational flow for implementing one or more data retention policies in connection with migration of data to a cloud storage platform according to an illustrative embodiment.

According to an embodiment, in file tiering, file archiving and block processes, as can be understood from the operational flow 200 in FIG. 2, the scheduler and walker component 112 requests files from the storage arrays 105 (and/or user devices 102 if retrieving files from the user devices 102) based the policy rules received from the policy engine 114. The storage array(s) 105 and/or user devices 102 return files and/or snapshots that match the policy rules. Alternatively, the cloud storage operation platform 110 (e.g., scheduler and walker component 112) iterates through the storage array 105 and/or user device 102 and retrieves the files and/or snapshots files matching the policy. In a non-limiting example, the scheduler and walker component 112 scans, for example, the files and/or snapshots and applies policy rules to each file and/or snapshot. If there are multiple rules in a policy, the scheduler and walker component 112 applies the rules to a given file and/or snapshot until a rule evaluates to "true," and then takes the action associated with the rule, such as, for example, "archive" or "don't archive." Some examples of rules governing whether files and/or blocks are archived may be based on one or more constraints such as, for example, when a file and/or snapshot was last accessed or modified, when file or snapshot attributes were last changed, and/or a size of a file or snapshot (e.g., >10 MB). Rules may also be based on file or snapshot names (e.g., only archive files or snapshots having certain names or parts of names) and/or directory name (e.g., only archive files or snapshots from specified directories or from directories having certain names or parts of names). If the scheduler and walker component 112 determines that a given file in a source storage location does not satisfy the policy constraints, that entry is skipped, the next entry is retrieved and the evaluation process is repeated for the next entry.

The embodiments provide methods to give users the ability to define data retention policies for stub files in local storage and the archived files in cloud storage to which the stub files correspond. More specifically, the policy engine 114 comprises a task and policy creation component 115, which generates an interface for a user to create one or more migration tasks and one or more associated policies. The interface is accessible via, for example, the user devices 102, and enables a user to specify a plurality of parameters for a migration task.

Some non-limiting examples of task parameters include: (i) a source path specifying a starting point of migration (e.g., source storage location); (ii) a destination path specifying a target storage location where the files will be moved; (iii) a migration policy specifying a set of rules (e.g., constraints) to be applied by the policy engine 114 in connection with evaluating whether and where particular files are to be migrated; (iv) a retention policy specifying a set of rules (e.g., constraints) to be applied by the policy engine 114 in connection with whether and for how long particular files are to be subject to retention; (v) one or more protocols (e.g., SMB, NFS) to use for reading the files from the source storage location and for writing the stub files to the target storage location; (vi) a name of the migration (e.g., share/export name); and (vii) server names or other identifying information (e.g., IP addresses) corresponding to the source and target storage locations. According to one or more embodiments, the interface may comprise a plurality of editable fields for a user to input the task and/or policy parameters.

Figure 3:
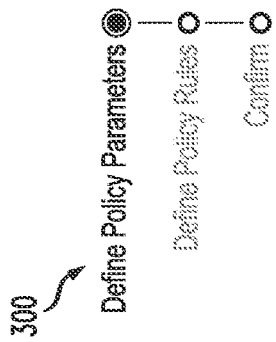
FIG. 3 depicts an example user interface for specifying a data retention policy according to an illustrative embodiment.

For example, in a non-limiting embodiment, referring to an example user interface 300 in FIG. 3, users may specify a policy for archiving, which includes, for example, a policy type (e.g., archive), a policy name (e.g., to a name of the cloud storage provider), a delay period for invoking the policy, and a retention period for the files archived to the cloud and whether the retention period will also apply to stub files. For example, for a specified retention period (e.g., 2 years), a cloud storage platform 130 will retain (e.g., prevent deletion, overwriting or other form of removal of) the archived files for the retention period even if deletion, overwriting or other form of removal of the files is attempted accidentally or as a result of a third party attack (e.g., malware or ransomware attack). Additionally, if stub retention is selected on the user interface 300, the cloud storage operation platform 110 and/or storage array 105 will retain (e.g., prevent deletion, overwriting or other form of removal of) stub files corresponding to the archived files for the specified retention period, even if deletion, overwriting or other form of removal of the stub files is attempted accidentally or as a result of a third party attack. Some non-limiting examples of policies may state, for example: (i) tier all the files whose size>1 GB to a given cloud storage platform 130 with a retention period of 30 days; or (ii) tier all the files whose access time>1 year to a given cloud storage platform 130 with a retention period of 1 year. As noted herein above, the files to be retained may be files that have been designated for archiving based on additional policies relating to, for example, file access time, file modification time, file attribute change time, file size, file name and a directory name. The policies and/or rules can be stored in the database 116.

In illustrative embodiments, during or after a migration operation, the cloud storage operation platform 110 (e.g., the cloud adapter component 113) generates and sends a request (e.g., API request) to a target storage location (e.g., one or more of the cloud storage platforms 130) that the target storage location invoke the policy to retain (e.g., prevent deletion, overwriting or other form of removal of) the archived files during a specified retention period, which may be, for example, a number of years, months, days or other unit of time). Different cloud storage platforms 130 may provide retention options for stored files and/or objects. Based on the received request to invoke a policy, a given cloud storage platform 130 may set a retention period specified in the policy in response to creating the object in the cloud storage platform 130.

For achieving data retention, information about whether retention is enabled for archived data and the corresponding retention period will be available in the policy pursuant to which a tiering task is being executed. The embodiments use compatible APIs for different cloud storage platforms 130 to set the retention for the data stored in the cloud. For example, the cloud adapter component 113 uploads data to a cloud storage platform bucket specified in a policy, and once the data is uploaded, the cloud storage platform 130 sets a retention duration for the uploaded data based on the retention period specified in the policy.

In an illustrative embodiment, the cloud storage operation platform 110 (e.g., the cloud adapter component 113) generates and sends an API request enabling object or file level protection for specific objects and/or files in a bucket. The API request may also include a request to configure a default retention period for objects and/or files placed in the bucket. The cloud storage operation platform 110 can request different retention modes, which correspond to different levels of protection for archived data. For example, in a first retention mode, users are not able to overwrite or delete a data object/file or alter its retention settings unless the users have permission. With the first retention mode, data objects and/or files are protected from deletion by most users, but some users may be granted permission to alter the retention settings and/or delete the data objects and/or files. In the first retention mode, a user must have bypass permission and explicitly include a specialized request header with any request requiring an override.

In a second retention mode, a protected data object and/or file cannot be overwritten or deleted by any user, including a root user. When an object and/or file is locked in the second retention mode, its retention settings (including the duration of the retention period) cannot be changed. The second retention mode ensures that an object and/or file cannot be overwritten and/or deleted for the duration of a retention period. The following depicts request syntax generated by and sent from a cloud storage operation platform 110 requesting the second retention mode instead of the first retention mode. "CSP" in the following syntax refers to "cloud storage platform."

PUT/{Key+}?retention&versionId=VersionId HTTP/1.1
 Host: Bucket. CSP Name
 x-csp-request-payer: RequestPayer
 x-csp-bypass-first-retention-mode: BypassFirstRetentionMode
 Content-MDS: ContentMD5
 x-csp-sdk-checksum-algorithm: ChecksumAlgorithm
 x-csp-expected-bucket-owner: ExpectedBucketOwner
 <?xml version="1.0" encoding="UTF-8"?>
 <Retention xmlns="http://CSP_Name/doc/date/">
 <Mode>string</Mode>
 <RetainUntilDate>timestamp</RetainUntilDate>
 </Retention>

The following depicts response syntax from a cloud storage platform 130 in response to a request that the second retention mode be used instead of the first retention mode.

HTTP/1.1 200
 x-csp-request-charged: RequestCharged

The following is an explanation of some uniform resource identifier (URI) parameters appearing in the above request. The bucket contains the object and/or files to which the retention settings are to be applied. In an illustrative embodiment, in connection with an Amazon® S3 cloud storage platform, when using an access point, requests are directed to an access point hostname. The access point hostname takes the form AccessPointName-AccountId.s3-accesspoint.Region.amazonaws.com. When using this action with an access point through Amazon Web Services software development kits (AWS SDKs), an access point Amazon Resource Name (ARN) is provided in place of a bucket name.

"Content-MD5" refers to the MD5 hash function for the request body. For requests made using the AWS Command Line Interface (CLI) or AWS SDKs, this field is calculated automatically. "Key" refers to the key name for the object and/or files to which the retention settings are to be applied. "VersionId" refers to a version identifier for the object and/or files to which the retention settings are to be applied. "x-csp-bypass-first-retention-mode" indicates whether first retention mode restrictions should be bypassed. "x-csp-expected-bucket-owner" indicates the account identifier of the expected bucket owner. If a bucket is owned by a different account than the expected bucket owner, the request fails with the HTTP status code 403 Forbidden (access denied). "x-csp-request-payer" confirms that a requester knows that they will be charged for the request. Bucket owners need not specify this parameter in their requests. "x-csp-sdk-checksum-algorithm" indicates the algorithm used to create the checksum for the object and/or files to which the retention settings are to be applied when using the SDK. This header will not provide any additional functionality if not using the SDK. In illustrative embodiments, when sending this header, there must be a corresponding x-csp-checksum or x-csp-trailer header that is also sent. Otherwise, the cloud storage platform 130 fails the request with the HTTP status code 400 Bad Request. If an individual checksum is provided, the cloud storage platform 130 ignores any provided ChecksumAlgorithm parameter.

In an illustrative embodiment, in connection with a Microsoft® Azure® cloud storage platform, the following API request, which can be generated and sent by the cloud storage operation platform 110, marks an object and/or files to which the retention settings are to be applied "immutable" for a certain period of time.

PUT https://myaccount.blob.core.windows.net/mycontainer/myblob?comp=immutabilityPolicies The following request headers are used to set the retention date and mode.

x-ms-immutability-policy-until-date: Indicates the "retention until" date to be set on a blob. This is the date until which the blob can be protected from being modified or deleted. For blob storage or a general purpose v2 account, valid values are in RFC1123 format. Past times are not valid.

x-ms-immutability-policy-mode: If not specified, default value is "unlocked." This request header indicates the immutability policy mode to be set on the blob. For blob storage or a general purpose v2 account, valid values are "unlocked" and "locked." Unlocked indicates that a user may change the policy by increasing or decreasing the retention until date. Locked indicates that changing the policy by increasing or decreasing the retention until date is prohibited.

In an illustrative embodiment, in connection with a Google® cloud storage platform, event-based holds and temporary holds are offered. An object and/or files can have one type of hold, both types, or neither hold placed on it. When an object and/or files are stored in a bucket without a retention policy, both hold types behave exactly the same. When an object and/or files are stored in a bucket with a retention policy, the hold types have different effects on the object and/or files when the hold is released. For example, an event-based hold resets the object's and/or files' time in the bucket for the purposes of the retention period. A temporary hold does not affect the object's and/or files' time in the bucket for the purposes of the retention period.

In connection with a Google® cloud storage platform, the cloud storage operation platform 110 generates and sends a request for a temporary hold on an object and/or files by:

1. Obtaining an authorization access token from the OAuth 2.0 Playground.
2. Creating a JavaScript Object Notation (JSON) file as follows:
 {
 "HOLD_TYPE": STATE
 }
 HOLD_TYPE is the type of hold on the object and/or files (e.g., "temporaryHold" or "eventBasedHold"). STATE is "true" to place the hold or "false" to release the hold.
3. Using cURL to call a JSON API with a PATCH Object request:
 curl-X PATCH--data-binary @JSON FILE NAME \
 H "Authorization: Bearer OAUTH2 TOKEN" \
 H "Content-Type: application/j son" \
 https://storage.googleapis.com/storage/v1/bBUCKET NAME/o/OBJECT NAME
 JSON FILE NAME is the path for the file that created in Step 2. OAUTH2 TOKEN is the access token generated in Step 1. BUCKET NAME is the name of the relevant bucket (e.g., "my-bucket"). OBJECT NAME is the URL-encoded name of the relevant object. For example, pets/dog.png, URL-encoded as pets %2Fdog.png.

In addition to the hold, the cloud storage operation platform 110 can also set a metadata header ("x-google-hold-until") as a custom tag. Whenever a delete call is sent for a particular object and/or files, the cloud storage platform 130 will check this header and set the hold state to "true" or "false" based on the specified duration or end date/time in the header. Only users with permission can change the hold state; hence preventing deletes by malicious actors.

In an illustrative embodiment, in connection with IBM® COS cloud storage platform, the following steps are performed to applying retention settings on objects and/or files.

1. The cloud storage operation platform 110 adds a retention policy on an existing bucket with the following example request.

PUT/example-bucket?protection=HTTP/1.1
   Authorization: {authorization-string}
   x-amz-date: <Date>
   x-amz-content-sha256: <Identifier>
   Content-MDS: <Identifier>
   Content-Type: text/plain
   Host: <Identifier>
   Content-Length: <Integer>
   <ProtectionConfiguration>
       <Status>Retention</Status>
       <MinimumRetention>
           <Days>100</Days>(or other value)
       </MinimumRetention>
       <MaximumRetention>
           <Days>10000</Days>(or other value)
       </MaximumRetention>
       <DefaultRetention>
           <Days>2555</Days>(or other value)
       </DefaultRetention>
   </ProtectionConfiguration>

As can be understood from the above example request, the retention policy can set the minimum, maximum and the default retention periods on the bucket level.

2. The cloud storage operation platform 110 uploads an object and/or files to a bucket with the retention policy including a "retention-period" header or a "retention-expiration-date" header.

The "retention-period" header comprises a non-negative integer specifying a retention period in seconds for an object and/or files. The object and/or files can be neither overwritten nor deleted until the amount of time that is specified in the retention period has elapsed. The "retention-expiration-date" header comprises a date in, for example, ISO 8601 format representing the date on which the object and/or files can be deleted or modified.

In an illustrative embodiment, a Content-MD5 header is also required. These headers apply to POST object and multipart upload requests. If uploading an object in multiple parts, each part requires a Content-MD5 header.

Figure 5:
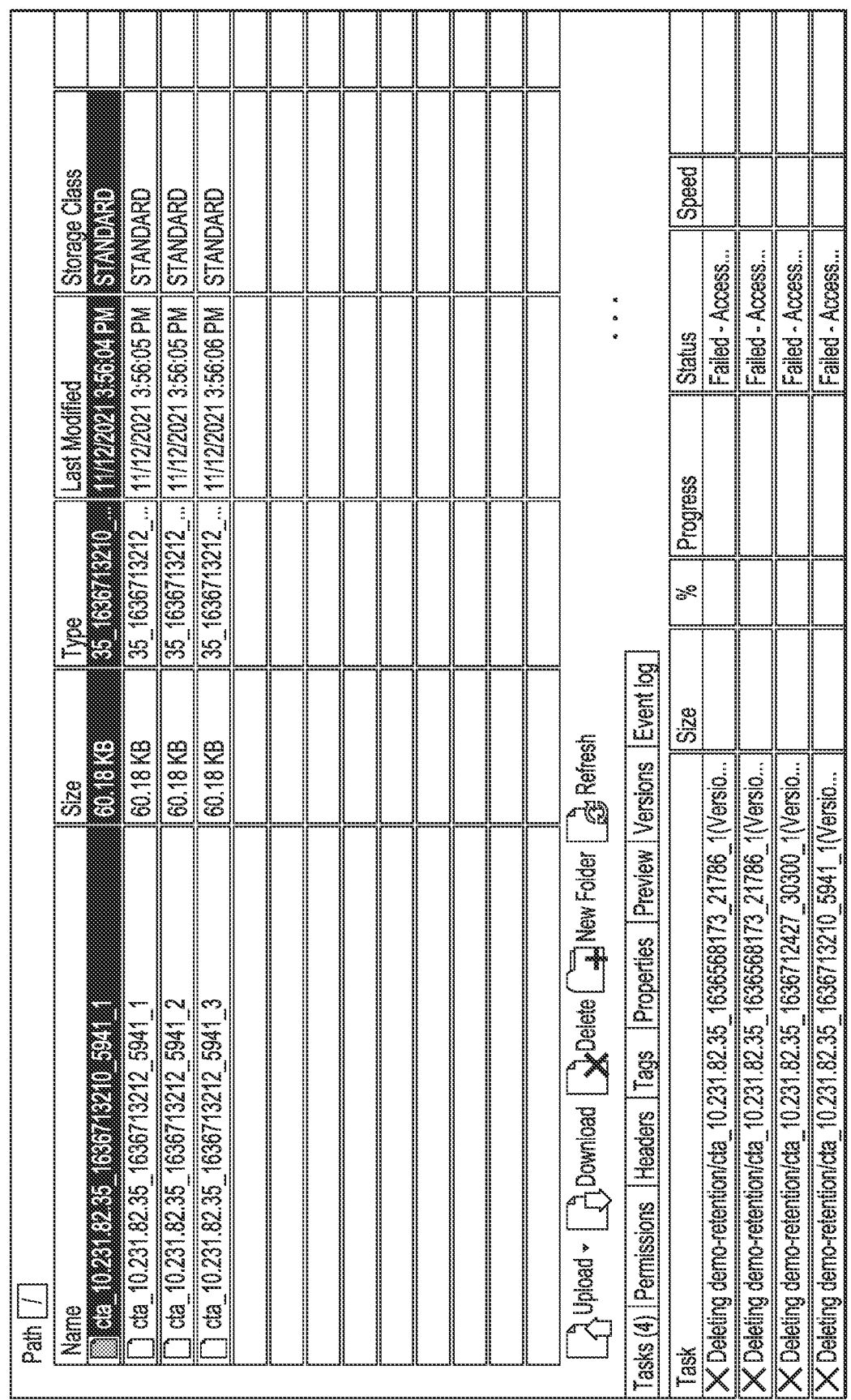
FIG. 5 depicts a screenshot of a result of attempted deletions of archived files in cloud storage, which are subject to a retention policy according to an illustrative embodiment.
Figure 6B:

FIG. 4 depicts a screenshot 400 of a result of an attempted deletion of a stub file subject to a retention policy. As can be seen in FIG. 4, access to the stub file is denied and deletion of the selected stub file from, for example, a storage array 105 or user device 102 is prevented. FIG. 5 depicts a screenshot 500 of a result of attempted deletions of archived files in a cloud storage platform 130, which are subject to a retention policy. As can be seen in FIG. 5, access to the archived files in cloud storage is denied and deletion of the selected archived files in cloud storage is prevented. The retention period specifies the period for which an archived file and/or stub file is to be retained in cloud storage and/or in local storage. Before the retention period expires, the files that have retention enabled cannot be deleted or overwritten from cloud or local storage. Once the retention period expires, the archived and stub files are able to be deleted or overwritten.

The stub file generation engine 117 generates a stub file in the source storage location (e.g., storage array 105) for respective ones of the files which have been migrated. The stub files comprise information (e.g., metadata) about the destinations in the target storage location (cloud storage platform 130) so that the files can be retrieved when a request for access is received from, for example, a user device 102. The information may comprise, for example, server names or other identifying information (e.g., IP addresses) about the destinations in the target storage location.

FIGS. 6A-6E depict portions 601, 602, 603, 604 and 605 of example pseudocode corresponding to specification and implementation of a data retention policy according to an illustrative embodiment. For example, the portion 601 includes pseudocode elements corresponding to specification of retention duration and start time of a task, the portion 602 includes pseudocode elements corresponding to local storage and the portions 603 and 604 include pseudocode elements relating to different operations for policy specification and application based on different cloud storage platform providers. The portion 605 includes pseudocode elements corresponding to execution of tasks and policies by a scheduler component (e.g., scheduler and walker component 112), NAS file servers (e.g., storage arrays 105), a cloud adapter component (e.g., cloud adapter component 113) and application of a stub file retention policy.

FIGS. 7A and 7B depict portions 701 and 702 of an example retention log corresponding to implementation of a data retention policy according to an illustrative embodiment. For example, portion 701 includes log elements corresponding to designating retention in NAS and cloud storage platforms, setting cloud storage platform and NAS retention times, identifying buckets and creating data blocks. Portion 702 includes log elements corresponding to retention mode and retention until date.

According to one or more embodiments, the database 116 used herein can be configured according to a relational database management system (RDBMS) (e.g., PostgreSQL). The database 116 in some embodiments is implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the tiering engine 111, the policy engine 114, the database 116 and the stub file generation engine 117 in other embodiments can be implemented at least in part externally to the cloud storage operation platform 110, for example, as stand-alone servers, sets of servers or other types of systems coupled to the network 104. For example, the tiering engine 111, the policy engine 114, the database 116 and the stub file generation engine 117 may be provided as cloud services accessible by the cloud storage operation platform 110.

The tiering engine 111, the policy engine 114, the database 116 and the stub file generation engine 117 in the FIG. 1 embodiment are each assumed to be implemented using at least one processing device. Each such processing device generally comprises at least one processor and an associated memory, and implements one or more functional modules for controlling certain features of the tiering engine 111, the policy engine 114, the database 116 and/or the stub file generation engine 117.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the tiering engine 111, the policy engine 114, the database 116, the stub file generation engine 117 and other components of the cloud storage operation platform 110 in the present embodiment are shown as part of the cloud storage operation platform 110, at least a portion of the tiering engine 111, the policy engine 114, the database 116, the stub file generation engine 117 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the tiering engine 111, the policy engine 114, the database 116, the stub file generation engine 117 and other components of the cloud storage operation platform 110, and the elements thereof can each be implemented in the form of one or more LXCs running on one or more VMs. Other arrangements of one or more processing devices of a processing platform can be used to implement the tiering engine 111, the policy engine 114, the database 116 and the stub file generation engine 117 as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the tiering engine 111, the policy engine 114, the database 116, the stub file generation engine 117 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the tiering engine 111, the policy engine 114, the database 116, the stub file generation engine 117 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

The operation of the information processing system 100 will now be described in further detail with reference to the flow diagram of FIG. 8. With reference to FIG. 8, a process 800 for implementing one or more data retention policies in connection with migration of data to a cloud storage platform as shown includes steps 802 through 806, and is suitable for use in the system 100 but is more generally applicable to other types of information processing systems comprising a cloud storage operation platform configured for implementing one or more data retention policies in connection with migration of data to a cloud storage platform.

In step 802, an input specifying one or more rules in connection with archiving one or more of a plurality of files from a source storage location (e.g., one or more storage devices 106 of a storage array 105) to a target storage location (e.g., one or more cloud storage platforms 130) is received. The one or more rules specify one or more constraints for retention of the one or more of the plurality of the files. The one or more constraints comprise a retention period for the one or more of the plurality of files in the target storage location. The one or more constraints may further comprise a delay period for invoking the one or more rules. In accordance with one or more embodiments, the one or more rules further specify one or more constraints for which of the plurality of files are to be archived, wherein the one or more constraints for which of the plurality of files are to be archived correspond to at least one of a file access time, a file modification time, a file attribute change time, a file size, a file name and a directory name. An interface is generated for a user to define the one or more rules.

In step 804, the one or more of the plurality of files are retrieved from the source storage location for migration to the target storage location. In step 806, a request is sent to the target storage location that the target storage location invoke the one or more rules to retain the one or more of the plurality of files in the target storage location. In illustrative embodiments, the request comprises an application programming interface request.

In the method, one or more stub files are generated in the source storage location. The one or more stub files respectively correspond to the one or more of the plurality of files which have been migrated from the source storage location to the target storage location. The one or more stub files are retained in the source storage location based at least in part on the one or more rules. The one or more rules further specify one or more constraints for retention of the one or more stub files, wherein the one or more constraints for retention of the one or more stub files comprise a retention period for the one or more stub files in the source storage location.

In illustrative embodiments, retaining the one or more stub files comprises preventing access to the one or more stub files during the retention period. Access to the one or more stub files is permitted upon expiration of the retention period.

It is to be appreciated that the FIG. 8 process and other features and functionality described above can be adapted for use with other types of information systems configured to execute data retention services in a cloud storage operation platform or other type of platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously enable users to utilize a CTA or other migration appliance to provide techniques for defining and implementing data retention policies for data migrated to cloud storage platforms, and for the generated stub files corresponding to the migrated data. Advantageously, users can input one or more rules which define different criteria to prevent unwanted deletion, overwriting or other form of removal of files that have been archived to cloud storage and their corresponding stub files, so that data in cloud storage and stub files in local storage are secure.

Conventional cloud tiering software in, for example, a CTA, is not configured for allowing users to specify and implement data retention policies for data that is archived to cloud storage. Advantageously, the embodiments provide techniques for users to set conditions on which data stored in the cloud is to be retained and to implement the designated policies upon migrating the data to cloud storage so that files meeting a specified criteria will be insulated from accidental removal (e.g., deletion, overwriting or other form or removal) and/or removal due to third party attacks. The embodiments provide technical solutions which enable a cloud storage operation platform (e.g., CTA) to request implementation of retention policies by cloud storage platforms 130 via one or more API requests, and to invoke retention policies in local storage. The embodiments advantageously enable access to archived files and their corresponding stub files to be restricted during a specified retention period to prevent unwanted removal of both the archived and stub files.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
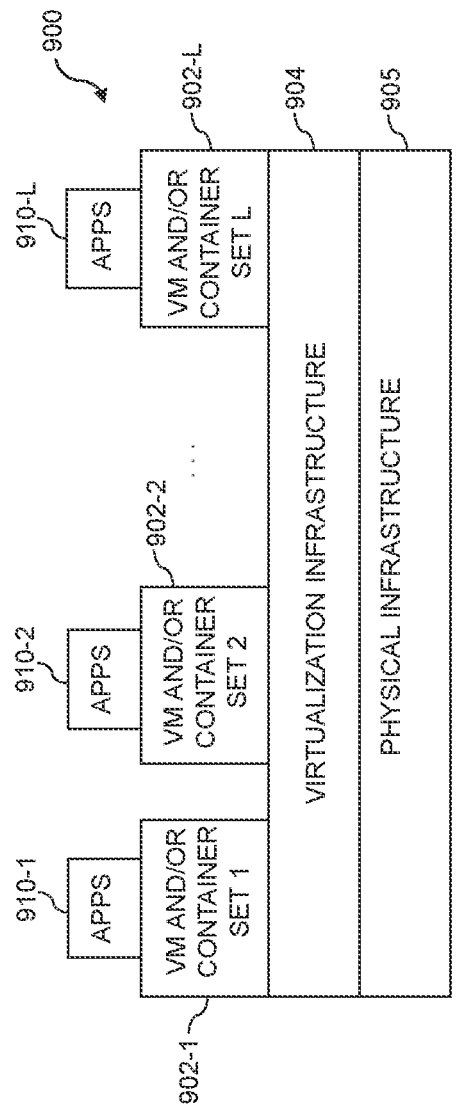

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-P, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing platform comprising a plurality of processing devices;
    said at least one processing platform being configured:
        to receive an input specifying one or more rules in connection with archiving one or more of a plurality of files from a source storage location to a target storage location, wherein the one or more rules specify one or more constraints for retention of the one or more of the plurality of files and of one or more stub files respectively corresponding to the one or more of the plurality of files;
        to retrieve the one or more of the plurality of files from the source storage location;
        to send the one or more of the plurality of files to the target storage location;
        to send a request via an application programming interface to the target storage location that the target storage location invoke the one or more rules, wherein the one or more rules are applied in the target storage location to retain the one or more of the plurality of files in the target storage location, and wherein the target storage location comprises a cloud storage platform; and
        to generate the one or more stub files in the source storage location in response to the sending of the one or more of the plurality of files to the target storage location, wherein the one or more rules are applied in the source storage location to retain the one or more stub files in the source storage location;
    wherein the one or more constraints for retention comprise a retention period that specifies a duration for which the one or more of the plurality of files and the one or more stub files are prohibited from being at least one of overwritten and deleted;
    wherein the one or more rules include one of a first retention mode and a second retention mode to retain the one or more of the plurality of files in the target storage location and retain the one or more stub files in the source storage location;
    wherein the first retention mode corresponds to a first level of retention and identifies one or more users with permission to modify the one or more rules; and
    wherein the second retention mode corresponds to a second level of retention that prohibits modification of the one or more rules.

2. The apparatus of claim 1 wherein the one or more of the plurality of files to which the one or more stub files respectively correspond have been migrated from the source storage location to the target storage location.

3. The apparatus of claim 1 wherein said at least one processing platform is configured to prevent access to the one or more stub files during the retention period.

4. The apparatus of claim 3 wherein said at least one processing platform is further configured to permit access to the one or more stub files upon expiration of the retention period.

5. The apparatus of claim 1 wherein the one or more constraints for retention further comprise a delay period for invoking the one or more rules.

6. The apparatus of claim 1 wherein the one or more rules further specify one or more constraints for which of the plurality of files are to be archived.

7. The apparatus of claim 6 wherein the one or more constraints for which of the plurality of files are to be archived correspond to at least one of a file access time, a file modification time, a file attribute change time, a file size, a file name and a directory name.

8. The apparatus of claim 1 wherein said at least one processing platform is further configured to generate an interface for a user to define the one or more rules.

9. The apparatus of claim 1 wherein said at least one processing platform comprises a cloud tiering appliance.

10. A method comprising:
    receiving an input specifying one or more rules in connection with archiving one or more of a plurality of files from a source storage location to a target storage location, wherein the one or more rules specify one or more constraints for retention of the one or more of the plurality of files and of one or more stub files respectively corresponding to the one or more of the plurality of files;
    retrieving the one or more of the plurality of files from the source storage location;
    sending the one or more of the plurality of files to the target storage location;
    sending a request via an application programming interface to the target storage location that the target storage location invoke the one or more rules, wherein the one or more rules are applied in the target storage location to retain the one or more of the plurality of files in the target storage location, and wherein the target storage location comprises a cloud storage platform; and
    generating the one or more stub files in the source storage location in response to the sending of the one or more of the plurality of files to the target storage location, wherein the one or more rules are applied in the source storage location to retain the one or more stub files in the source storage location;
    wherein the one or more constraints for retention comprise a retention period that specifies a duration for which the one or more of the plurality of files and the one or more stub files are prohibited from being at least one of overwritten and deleted;
    wherein the one or more rules include one of a first retention mode and a second retention mode to retain the one or more of the plurality of files in the target storage location and retain the one or more stub files in the source storage location;
    wherein the first retention mode corresponds to a first level of retention and identifies one or more users with permission to modify the one or more rules;
    wherein the second retention mode corresponds to a second level of retention that prohibits modification of the one or more rules; and
    wherein the method is performed by at least one processing platform comprising at least one processing device comprising a processor coupled to a memory.

11. The method of claim 10 wherein the one or more of the plurality of files to which the one or more stub files respectively correspond have been migrated from the source storage location to the target storage location.

12. The method of claim 10 further comprising preventing access to the one or more stub files during the retention period.

13. The method of claim 12 further comprising permitting access to the one or more stub files upon expiration of the retention period.

14. The method of claim 10 wherein the one or more rules further specify one or more constraints for which of the plurality of files are to be archived.

15. A computer program product comprising a non-transitory processor-readable storage medium having stored therein program code of one or more software programs, wherein the program code when executed by at least one processing platform causes the at least one processing platform:
to receive an input specifying one or more rules in connection with archiving one or more of a plurality of files from a source storage location to a target storage location, wherein the one or more rules specify one or more constraints for retention of the one or more of the plurality of files and of one or more stub files respectively corresponding to the one or more of the plurality of files;
to retrieve the one or more of the plurality of files from the source storage location;
to send the one or more of the plurality of files to the target storage location;
to send a request via an application programming interface to the target storage location that the target storage location invoke the one or more rules, wherein the one or more rules are applied in the target storage location to retain the one or more of the plurality of files in the target storage location, and wherein the target storage location comprises a cloud storage platform; and
to generate the one or more stub files in the source storage location in response to the sending of the one or more of the plurality of files to the target storage location, wherein the one or more rules are applied in the source storage location to retain the one or more stub files in the source storage location;
wherein the one or more constraints for retention comprise a retention period that specifies a duration for which the one or more of the plurality of files and the one or more stub files are prohibited from being at least one of overwritten and deleted;
wherein the one or more rules include one of a first retention mode and a second retention mode to retain the one or more of the plurality of files in the target storage location and retain the one or more stub files in the source storage location;
wherein the first retention mode corresponds to a first level of retention and identifies one or more users with permission to modify the one or more rules; and
wherein the second retention mode corresponds to a second level of retention that prohibits modification of the one or more rules.

16. The computer program product according to claim 15 wherein the one or more of the plurality of files to which the one or more stub files respectively correspond have been migrated from the source storage location to the target storage location.

17. The computer program product according to claim 15 wherein the program code further causes the at least one processing platform to prevent access to the one or more stub files during the retention period.

18. The computer program product according to claim 17 wherein the program code further causes the at least one processing platform to permit access to the one or more stub files upon expiration of the retention period.

19. The computer program product according to claim 15 wherein the one or more rules further specify one or more constraints for which of the plurality of files are to be archived.

20. The computer program product according to claim 19 wherein the one or more constraints for which of the plurality of files are to be archived correspond to at least one of a file access time, a file modification time, a file attribute change time, a file size, a file name and a directory name.

* * * * *